United States Patent [19]

Hoy et al.

[11] 4,292,496

[45] Sep. 29, 1981

[54] VERTICAL PLATE WELDING USING DOUBLE BEVEL JOINT

[75] Inventors: Malcolm G. Hoy; Walter R. Reichelt, both of New Kensington, Pa.

[73] Assignee: Aluminum Company of America, Pittsburgh, Pa.

[21] Appl. No.: 112,833

[22] Filed: Jan. 17, 1980

[51] Int. Cl.³ .............................................. B23K 9/16
[52] U.S. Cl. ................................ 219/126; 219/137 R; 219/74
[58] Field of Search ................ 219/137 R, 74, 75, 126

[56] References Cited

U.S. PATENT DOCUMENTS

| | | | |
|---|---|---|---|
| 2,916,600 | 12/1959 | Tichler | 219/137 R X |
| 3,307,014 | 2/1967 | Toyoaki Bada et al. | 219/137 R |
| 3,351,734 | 11/1967 | Masaysu Arikawa et al. | 219/137 R |
| 3,748,429 | 7/1973 | Agusa et al. | 219/137 R |
| 3,825,712 | 7/1974 | Gibbs | 219/137 R |
| 4,038,514 | 7/1977 | Ashton | 219/137 R X |

OTHER PUBLICATIONS

*Metals Handbook*, 8th Edition, vol. 6, "Welding and Brazing" American Society For Metals, Oh., 1971, TA 472 A3, p. 148.

*Primary Examiner*—Gene Z. Rubinson
*Assistant Examiner*—Keith E. George
*Attorney, Agent, or Firm*—Patrick J. Viccaro

[57] ABSTRACT

A method is provided of vertical gas metal-arc two-sided welding of thick plate in a single welding pass on each surface of the plate. The method includes providing a first weld groove on one surface of the plate into which a weld bead is deposited in a single pass. Thereafter, a second weld groove is formed on the opposite surface of the plates by removing base plate material along the joining line to a depth extending at least to the first weld bead penetrating from the welding pass in the first weld groove. The plates are further joined together by depositing a weld bead in a single pass along the second welding groove. The welding is provided by impressing a direct electric current of from 290 to 420 amperes between an electrode and the plates shielded primarily by argon gas.

A metal article and a welded joint are also provided.

25 Claims, 6 Drawing Figures

VERTICAL PLATE WELDING USING DOUBLE BEVEL JOINT

BACKGROUND OF THE INVENTION

This invention relates to vertical gas metal-arc welding of metal plate. More particularly, the invention relates to two-sided vertical welding of thick plate, such as aluminum and its alloys, in a single welding pass on each surface of the plate.

It is known in the art that welding thick plate presents peculiar problems. For example, the thicker the plate, the more difficult it is to deposit high quality welds with efficiency. Methods known in the art for welding thick plate have achieved only varying success through the use of special joint geometry and other techniques. Conventionally, U, V, X or Y shaped edge preparations are used for one-sided and two-sided welding of thick plate. It is also known in the art that increasing the welding current increases weld efficiency and decreases the number of weld passes because of the resulting increase in the amount of molten metal deposited from the welding electrode wire. Furthermore, it is known that a reduction in the welding speed causes an increase in the deposited metal per unit length of the weld bead. Weld bead penetration can be increased by either increasing the welding current or decreasing the welding speed. Such adjustments, however, can present problems in the weld notch toughness and the sensitivity of the weld to its environment. Such considerations and problems are applicable generally to various metals and alloys, including steel alloy and aluminum alloy plates.

Although much effort has been made to improve various aspects of different thick plate welding processes, only limited success have been achieved. For example, U.S. Pat. No. 3,307,014, issued Feb. 28, 1967, relates to one pass butt welding from either one side or from both sides of the steel plate having I-shaped edges and the use of a flux cored wire. That method also contemplates using a backing member for supporting the flux. Electric arc welding of relatively thick steel plate from one side is shown in U.S. Pat. No. 3,351,734, issued Nov. 7, 1967, using an X-shaped groove and a backup plate. It is also known from U.S. Pat. No. 3,748,429, issued July 24, 1973, of a method of welding steel plate from both sides using at least two electrodes and a special joint geometry (Y or double V joints shown) which establishes the relationship between the depth of the groove and the root face width.

For all purposes herein, reference to "side" is used interchangeably with "surface" of the article or plate which is welded. For example, one-sided or two-sided welding refers to welding plate articles by depositing a weld bead on, respectively, one surface only or both surfaces.

Such prior art methods for welding plate on both sides have any one of several disadvantages. For example, extensive edge preparation of the plate before welding to form U, V, X or Y shaped grooves can add to the costs of welding. Furthermore, the cost of welding increases as the number of welding passes necessary to provide the required welding bead filler material increases. Also, more welding passes increase the labor cost of welding, i.e. time spent on the job, as well as increased shielding gas consumption. For methods of welding plate on both sides, back chipping is necessary for removing weld bead material from the back side of the plate to provide a clean weld surface prior to depositing the second weld. When back chipping is done manually, the overall welding costs rise with added labor costs.

It is desirable that an economical method be found for vertical gas metal-arc welding of thick plate, such as aluminum and its alloys. Such a method should provide a quality weld without incurring the costs attending specialized welding equipment, extensive edge preparation, and multiple welding passes.

SUMMARY OF THE INVENTION

In accordance with the present invention, a method is provided of gas metal-arc welding of substantially vertical plates having abutting edges to be welded forming a weld line, and providing a first weld groove on one surface of the plates by removing plate material from the edge of only one plate and leaving on that edge a planar root portion substantially normal to the plate surface and equal to or less than the plate thickness for welding the plates together in a single pass along the first weld groove. The method includes providing thereafter a second weld groove on the opposite surface of the plate by removal of plate material substantially from the abutting edge of the same plate to a depth extending at least to the weld bead deposited from the welding pass in said first weld groove on the opposite surface of the plates. The plates are welded together in a single pass to completely fill the second weld groove. The welding bead is deposited by impressing a direct electric current of 290 to 420 amperes between an electrode and the plates with the electric arc formed thereby shielded primarily by argon gas.

The welded joint of the present invention includes a joining line lying in a substantially vertical plane between the abutting edges of metal articles, and having a first weld bead extending along the joining line on one surface of the joined metal article deposited in a single welding pass and penetrating from the plate surface to a depth equal to or greater than one-half the plate thickness. A second weld bead on the opposite surface of the joined articles is deposited in a single welding pass in a second weld groove formed by removing base metal material substantially from one plate along a line coextensive with the joining line to a depth at least extending to the first weld bead penetrating from the opposite surface of the joined articles. Weld grooves for the first and second weld beads aree formed by removal of plate material substantially from the edge of only one plate.

The two-sided welded metal plate of the present invention includes a welded joint extending along a joining line between abutting edges of the welded plates. A first weld bead deposited in a single welding pass extends along the joining line on one surface of the joined articles and a second weld bead deposited in a single welding pass on the opposite surface extends along a line coextensive with the joining line. The first weld bead penetrates to a depth from the plate surface equal to or more than one-half the plate thickness. The second weld bead is deposited in a second weld groove formed by removing base material substantially from one metal plate to a depth at least extending to the first weld bead penetrating from the opposite surface. Weld grooves for the first and second weld beads are formed by removal of plate material substantially from the edge of the same plate.

The present invention not only provides quality welds having good mechanical properties, but it also eliminates the time and cost of back chipping on two-sided welding. More efficient methods, such as cutting, sawing or machining, can be used for removal of plate material to form a second weld groove on the opposite surface of the plates. Such removal not only provides a clean groove surface on which to deposit a second weld bead, but also has the advantage of requiring less edge preparation prior to welding. An unexpected advantage is that the welding can be accomplished in fewer weld passes, specifically one pass per side for plate ranging from $\frac{1}{2}$ to $1\frac{1}{2}$ inches (12 to 38 mm) in thickness. Conventional gas metal-arc welding equipment capable of handling high currents can be used in the method. The method provides further economy with an overall 50 to 80% less arc time, and because of the less arc time, the method reduces the shielding gas consumption, the power used, and the total filler material required for weld deposition. Furthermore, the use of shielding gas of primarily argon gas, which is a much cheaper shielding gas material, reduces the overall cost of materials when compared with shielding gas compositions which include substantial amounts of more costly gases, such as helium. The resulting welded plates have high quality weld joints with low defect rates and minimal porosity.

DETAILED DESCRIPTION OF THE PREFERRED EMBODIMENTS OF THE INVENTION

Figure 1:
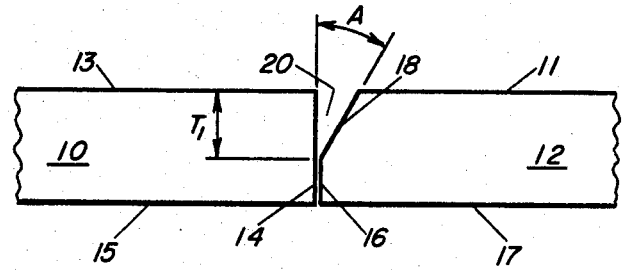
FIG. 1 is an end elevation view illustrating plate edge preparation of the present invention.

FIGS. 1-4 illustrate a preferred embodiment of plates 10 and 12 welded in accordance with the method of the present invention. Plates 10 and 12 have edges 14 and 16, respectively, abutting to form a groove 20 on one surface of the plates. Subsequent to depositing a weld bead 22 in weld groove 20, a weld groove 26 is formed on the opposite surface of the plates and thereafter another weld bead 28 is deposited.

FIG. 1 illustrates a first plate 10 having a surface 13 and a planar edge portion 14 being substantially normal to plate surface 13. Second plate 12 includes a planar root or land portion 16 and a beveled surface portion 18. Planar root portion 16 shown abutting planar portion 14 of plate 10 is substantially normal to surface 11 of plate 12. Preferably, first weld groove 20 is formed between the beveled surface 18 of second plate 12 and the planar edge 14 of first plate 10. Groove 20 is shown formed as a result of edge preparation of only one plate, specifically plate 12. Alternatively, groove 20 may be formed by edge preparation of both plates, for example, by providing a beveled surface on the edges of both abutting plate 10 and 12. Preferably, first weld groove 20 is provided with a minimum of plate edge preparation by removing edge material from only one plate.

In providing first weld groove 20, preferably, the depth, $T_1$, of groove 20 should be equal to or greater than one-half the thickness of plates 10 and 12. The remaining edge material, planar root portion 16, of the edge of plate 12 is equal to or less than one-half of the plate thickness. The width of the weld groove 20 is determined by a groove angle defined by the inner sidewalls of weld groove 20. In FIG. 1, adjacent to and contiguous with planar root portion 16 is beveled surface 18 which defines a groove angle A of between 25° to 35° as measured between beveled surface 18 of plate 12 and a plane parallel to the edge of plate 12 and normal to surface 11 of plate 12, such as planar edge 14 of plate 10. Preferably, groove angle A ranges from 27.5° to 32.5°. If both abutting plates have their respective edges prepared by removal of edge material, the width of the weld groove depends upon groove angle A measured between the beveled surface of each plate.

Though the Figures show weld groove 20 defined by planar surfaces, 18 and 14, for forming a modified or one-half K-shaped joint, the angle defining surfaces may be nonplanar and form other joint configurations within the scope of the present invention. When a groove defining surface, such as surface 18, is not planar, in whole or in part, such as concave or convex, groove angle A may be measured from a "mean line" through surface 18 to a plane parallel to the edge of plate 12 and normal to surface 11 of plate 12. The mean line is a straight line representing a nonplanar groove surface for purposes of defining the angle A.

In providing first weld groove 20, it is preferred that the groove be narrow and deep such that a narrow and deep weld bead results. By narrow and deep, it is meant that the single bead thickness dimension is at least 50% of the bead width dimension.

Figure 2:
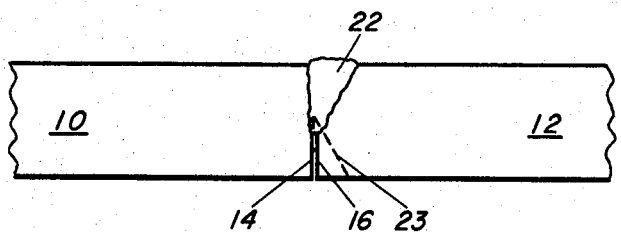
FIG. 2 is an end elevation view showing plates partially welded on one side.

FIG. 2 illustrates plates 10 and 12 joined together by weld bead 22 deposited in first weld groove 20. Weld bead 22 is shown penetrating to a depth greater than one-half the thickness of plates 10 and 12. Plate material to be removed is shown by the wedge-shaped section defined by planar edge portion 14 of plate 10 and removal line 23 (dotted) to form a second weld groove on the surface of the welded plates opposite the first weld bead. The base plate material to be removed extends at least to the depth to contact the first weld bead penetrating from the opposite surface. Preferably, the material to be removed includes a portion of the first weld bead at its farthest penetration. Furthermore, it is preferred that the second weld groove have substantially the same size and shape as the first weld groove.

Figure 3:
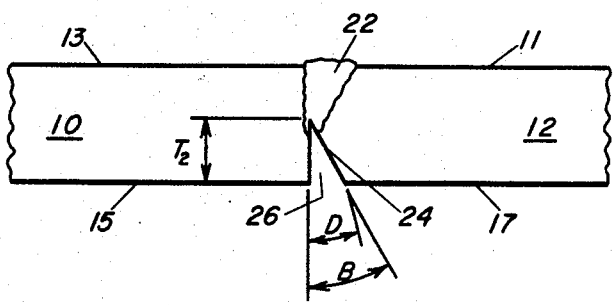
FIG. 3 is an end elevation view illustrating further plate edge preparation after one-side welding.

FIG. 3 also illustrates plates 10 and 12 joined together by weld bead 22 and additionally shows plate edge preparation defining second weld groove 26. After weld bead 22 is deposited in first weld groove 20, second weld groove 26 is prepared in the opposite surfaces 15 and 17 of joined plates 10 and 12, respectively. Preferably, groove 26 is narrow and deep. Groove 26 is formed by the removal of the base plate material in back of first weld bead 22 coextensive with the weld or joining line. Plate material is removed substantially from one plate to a depth, $T_2$, extending at least to weld bead 22 which penetrates the plate material as a result of the welding pass made on the opposite side of the plates. Preferably, the removed material includes a portion of first weld bead 22 at its farthest penetration. Preferably, plate material is removed substantially from only one plate, such as plate 12, with only small amounts of plate material removed or shaved from plate 10 to clean the surface of any oxides remaining after depositing the first weld bead. Alternately, material can be removed from both plates, for example, to form a V-shaped groove. The plate material may be removed by conventional machining, such as sawing or cutting, along line 23 to provide beveled surface 24 at least to the depth of the first weld bead to provide second weld groove 26 with clean surfaces suitable for welding. The width of weld groove 26 depends upon groove angle B formed between the inner sidewalls of the weld groove. Preferably, when second weld groove 26 is formed by the removal of plate material from only one plate, such as plate 12 shown in FIG. 3, angle B formed is measured from beveled surface 24 of plate 12 to a plane parallel to the edge of plate 12 and normal to the plate surface 17 of plate 12. The groove sidewalls are surface 24 of plate 12 and planar edge 14 of plate 10. Groove angle B may range from 25° to 35° and preferably ranges from 27.5° to 32.5°. Groove angle B may be measured in a manner similar to angle A when a groove defining surface is nonplanar. In the alternative, if second weld groove 26 is formed by removing plate material from both plates 10 and 12, then groove angle B is measured between the groove defining surface of each plate.

Figure 4:
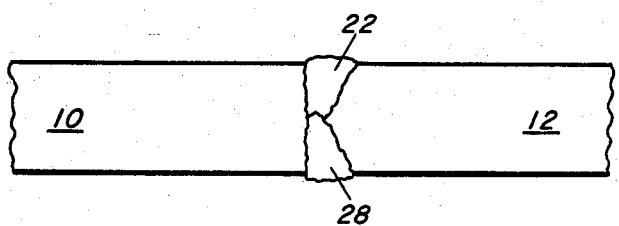
FIG. 4 is an end elevation view showing plate edges welded in accordance with the present invention.

FIG. 4 illustrates an elevation view of plates 10 and 12 welded together in accordance with the present invention. Weld bead 22 is shown on one surface of the plates extending at least through one-half the thickness of the plate material. Second weld bead 28 is shown from the other surface extending to the depth of the first weld bead 22 penetration and overlapping with and joining to first weld bead 22. Both weld beads are deposited in a single pass on each side of the plate to provide a welded plate article having a weld joint with good mechanical properties. The welds are of x-ray quality and radiographic tests show low defect rates in the welds and welds with minimal porosity.

The overall or total weld bead thickness may be up to twice as great as a single bead width. The ratio of bead width to total weld bead thickness should fall within the range from 1:1 to 1:2, and preferably, the ratio is closer to about 1:2. The total weld bead thickness is the sum of the thicknesses of first weld bead 22 and second weld bead 28. Furthermore, the total weld bead thickness may be slightly greater than the thickness of the welded plates due to the slight projection of each weld bead (22 and 28) from the plate surfaces on its respective side of welded plates 10 and 12 (see FIG. 4). The weld bead projections may be subsequently machined flat with the welded plate surfaces. For practical purposes, first weld bead 22 and second weld bead 28 are assumed to have the same bead width.

In the method of gas metal-arc welding, plates 10 and 12 are placed in abutting relation. The method of the present invention has been used effectively for welding substantially vertical plates wherein the abutting edges of the plate to be welded form a weld line or joining line lying substantially vertically. The method of the present invention, however, may be equally suited for welding horizontal joints.

Preferably, before abutting the edges of plates 10 and 12 to be welded, plate 12 undergoes edge preparation, for example, to form beveled surface 18. The plates then are positioned in abutting relationship to form first weld groove 20 between beveled surface 18 and planar edge portion 14 of plate 10. Prior to welding, the edges may be solvent wiped in a conventional manner, such as with a petroleum-based solvent.

Conventional gas metal-arc welding equipment can be used for carrying out the method of the present invention. The equipment must be capable, however, of handling relatively high welding currents. Such currents may range from 290 to 420 amperes, and preferably range from 325 to 350 amperes. The power source for the welding equipment should provide direct current of reverse polarity and may also be conventional. Power sources that provide drooping voltage/amperage characteristics or constant potential or a pulsed arc are all useful to carry out the method of the present invention.

Figure 5:
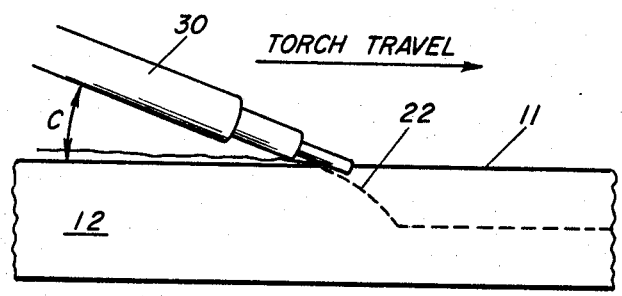
FIG. 5 is a side elevation view showing the relative position of the welding torch with respect to the plate surface.

In carrying out the method of the present invention, the torch (and electrode passing therethrough) are positioned in a particular fashion as shown in FIG. 5. Torch 30 is oriented at a positive lead angle to the joining line. A positive lead angle C positions the torch tip ahead of the torch and the weld bead. By ahead, it is meant in the direction of travel of the torch along the joining line as weld bead 22 is deposited in the weld groove behind the torch. The angle is measured in a plane through the torch and perpendicular to the surface of the article to be welded from the torch to the plane of article surface. Angle C ranges from 5° to 15°, and preferably 9° to 11°.

Furthermore, torch 30 lies substantially in the plate including the sidewall of a weld groove on the plate that was edge prepared. For example, torch 30 would lie substantially in the plane including beveled sidewall surface 18 of weld groove 20 shown in FIG. 1, and a plane including beveled sidewall surface 24 of weld groove 26 shown in FIG. 3, oriented at angles A and B, respectively. Preferably, torch 30 lies in a plane parallel to and intersecting with the weld line oriented at a torch angle D which is smaller than angles A and B. Angle D is an included angle between such a plane of the torch and a plane parallel to the weld line and normal to the plate surface, for example, surface 17 of plate 12. Angle D ranges from 15° to 25°, and preferably 19° to 21°.

Figure 6:
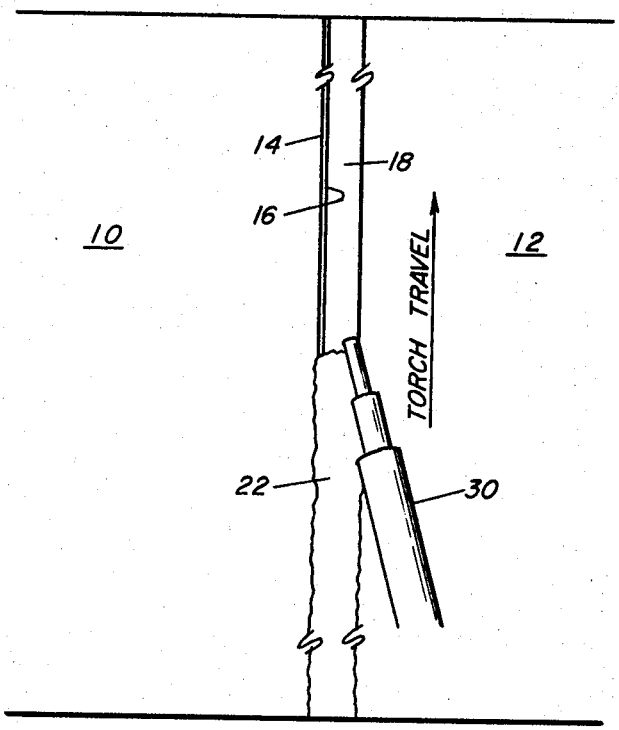
FIG. 6 is a plan view of welded plates illustrating the torch position with respect to the welding line.

FIG. 6 further illustrates torch 30 positioned with respect to the weld line. The plan view of FIG. 6 shows torch 30 directing the electrode tip onto beveled surface 18 of weld groove 20 when torch 30 is oriented in accordance with angles C and D. The orientation of the torch in accordance with the present invention facilitates cleaning of the parent or base metal oxide from the article being welded on the beveled surfaces of the joint during the welding procedure.

A conventional electrode of 1/16 inch (1.6 mm) in diameter can be used; however, in order to facilitate higher deposition rates, a larger than conventional electrode should be used. Preferably, an electrode 3/32 inch (2.4 mm) in diameter is used. Using such a thicker electrode provides economy to the method over using a thinner electrode which requires more welding passes. A larger electrode also provides a better weld because less oxides are formed on the weld than when using an electrode of smaller diameter.

The method of gas metal-arc welding of the present invention uses argon as the primary shielding gas. Preferably, only argon is used. As is known in the art, as gas composition includes argon gas to allow for narrow root bead width and good penetration. Furthermore, argon provides for better arc cleaning and starting. In the alternative, mixtures of inert gases, such as argon and helium, may be used, but argon should make up at least 80% of the shielding gas composition. Preferably, low flow rates of the gas are used ranging from 50 to 100 cubic feet per hour, with 70 to 80 cubic feet per hour preferred.

In accordance with the present invention, the weld is deposited while causing the torch to travel relative to the welding groove at a speed commensurate with weld bead deposition to the full depth of the welding groove. Preferably, welding of a substantially vertical joint is conducted in the upward direction from the lower end of the weld line to the upper end. The rate of travel may range from 6 to 8 inches per minute (15.2 to 20.3 cm per minute), and preferably about 6.5 to 7.5 inches per minute (16.5 to 19.0 cm per minute), for a single pass weld. As a result of the method of the present invention, less cumulative heat is deposited in a weld joint although more energy is expended per welding pass to deposit narrow and deep weld beads with a bead thickness at least as great as the bead width.

After welding the plates together on one side in accordance with the above-described method, the method of the present invention requires preparation of the backside of the plate for weld deposition. Preferably, plate material is removed from the back of the weld in a conventional manner using a saw, cutter, or other machining apparatus to provide a second weld groove 26 with a clean surface. The second weld groove is formed to a depth extending at least to the depth of the first weld bead penetration, and then the plates are welded in accordance with the above-described steps on the backside of the plate by depositing a weld bead in second weld groove 26. The depth of penetration of first weld bead 22 may necessitate some minor changes in the welding parameters for depositing a weld bead on the back of the plates. For example, the rate of travel of the torch and electrode along the weld line may be increased in order to reduce the amount of weld deposition because of the decreased depth of the weld groove. Alternatively, the welding current may be decreased slightly. Any such variations, however, are minimal and fall within the scope of the present invention.

The method of the present invention thus provides an improved gas metal-arc welding method wherein an overall 50 to 80% less arc time may be required and where the number of passes is reduced to one pass per side or surface of the plate for welding thick plate ranging from ½ to 1½ inches (12.7 to 38.1 mm). Though the welding method may be particularly suited to aluminum and its alloys, the method may also be suitable for other metals, such as steel alloys.

In order to more completely understand the present invention, the following example is presented.

EXAMPLE

The method of the present invention was used for welding 5083-0 aluminum alloy plate having a thickness of one inch (25.4 mm). The weld joint was 2 feet (60.9 cm) in length and was welded in two passes (one pass per side of the plate) at a total welding time of 6.8 minutes. A total gas consumption of 240 liters of argon resulted in the metal deposition of 0.35 kilograms. A 2.4 millimeter electrode diameter was used on each pass. A voltage potential of 26 volts, an amperage ranging from 300 to 320 amps direct current, and an argon gas flow rate of 75 cubic feet per hour was used. The torch level was at 7 inches per minute (17.7 cm per minute) with a wire feed of 170 inches per minute (431 cm per minute). Using the method of the present invention the plate was welded economically with a joint having good mechanical properties and minimal porosity.

For comparative purposes, plate of the same alloy and size is welded using a conventional gas metal-arc process and using an electrode diameter of 1.6 millimeters but using only argon as the shielding gas instead of a gas mixture, as is common. The plate is satisfactorily welded in 8 passes (4 passes per side). The gas consumption is 336 liters of 0% helium-100% argon gas with the total metal deposited from the electrode of 0.7 kilograms. Using the conventional process, the plate is welded with a voltage potential of 28 volts, an amperage of 270 amps direct current. Both plates are edge prepared in a conventional manner to form a V-shaped joint prior to welding.

The improved gas metal-arc welding process of the present invention provides welds having a smooth weld surface and high quality with little porosity and good mechanical properties. Thick plates can be welded in two passes (one per side) in a portion of the time required for welding with conventional gas metal-arc procedures. With the savings of time and materials, the method of the present invention is more economical than prior art welding methods.

Although preferred embodiments and alternative embodiments have been described, it will be apparent to those skilled in the art that changes can be made therein without departing from the scope of the present invention.

What is claimed is:

1. A method of gas metal-arc welding of substantially vertical plates comprising:
   (a) providing a first plate and a second plate with abutting edges to be welded forming a substantially vertical weld line;
   (b) providing a first weld groove on one surface of the plates along the weld line formed by the abutting edges by removing plate material from the edge of only the second plate, the second plate edge including a planar root portion substantially normal to the plate surface and equal to or less than one-half the plate thickness;
   (c) welding the plates together in a single upward pass by depositing a weld bead in the first weld groove to completely fill said groove;
   (d) thereafter, providing a second weld groove on the opposite surface of the welded plates by removing plate material substantially from the abutting edge of only said second plate to a depth extending at least to the weld bead deposited in the first weld groove on the opposite surface of the plates; and thereafter
   (e) welding the plates together in a single upward pass by depositing a weld bead in the second weld groove to completely fill said second groove;
   (f) said welding steps include impressing a direct current of 290 to 420 amperes between an electrode of a welding torch and said plates with the electric arc formed thereby shielded primarily by argon gas, the torch maintaining a positive lead angle relative to the plate surface.

2. The method as set forth in claim 1 wherein providing the first weld groove includes preparing a substantially beveled surface on the second plate along the edge to be welded, the beveled surface forming an angle of between 25° to 35° as measured from the beveled surface to a plane parallel to the plate edge and normal to the plate surface, the second plate edge including a planar root portion adjacent the beveled surface.

3. The method as set forth in claim 1 wherein the steps of welding the plates together in a single pass on opposite sides of the plates include depositing a narrow weld bead having the bead thickness at least 50% of the bead width.

4. The method as set forth in claim 3 wherein the total weld bead thickness is up to about twice as great as the bead width.

5. The method as set forth in claim 1 wherein the rate of travel of a torch relative to the welding groove ranges from 6 to 8 inches per minute.

6. The method as set forth in claim 1 wherein a torch maintains a positive lead angle relative to the plate surface being welded of 5° to 15° during the welding steps.

7. The method as set forth in claim 1 wherein a torch lies substantially in a plane including a sidewall surface of the weld groove formed by removing plate material from said second plate.

8. The method as set forth in claim 1 wherein the welding torch maintains a torch angle relative to the weld line of 15° to 25° during the welding steps.

9. The method as set forth in claim 1 wherein the electrode diameter is greater than 1/16 inch.

10. The method as set forth in claim 1 wherein said plate thickness ranges from ½ to 1½ inches (12 to 38 mm).

11. The method as set forth in claim 1 wherein said shielding gas is 100% argon.

12. The method as set forth in claim 1 wherein said plates are of aluminum and its alloys.

13. A method of gas metal-arc welding of substantially vertical thick plates of aluminum and its alloys comprising:
(a) providing a first plate with a planar edge to be welded, said edge being substantially normal to said plate surface;
(b) providing a second plate to be welded along an edge;
(c) preparing a substantially beveled surface along the edge to be welded of said second plate, said surface beveled at an angle of between 25° to 35° as measured from said beveled surface to a plane parallel to the edge and normal to said second plate surface, said second plate edge including a planar root portion adjacent said beveled surface, substantially normal to said second plate surface and equal to or less than one-half the plate thickness;
(d) positioning said planar edge of said first plate abutting said planar root portion of said second plate edge to form a substantially vertical narrow and deep first weld groove between said beveled surface of said second plate edge and said planar edge of said first plate;
(e) welding the plates together in a single upward pass along said first weld groove;
(f) thereafter, removing plate material from the opposite surface of the welded plates substantially from the abutting edge of only said second plate to form a narrow and deep second weld groove having a depth extending at least to the weld in said first weld groove on the opposite surface of the plates; and
(g) welding the plates in a single upward pass along said second weld groove;
(h) said welding steps include establishing an electric arc from a direct current reverse polarity source of 290 to 420 amperes between a large diameter electrode of a welding torch and said plates, the arc shielded primarily by argon gas while causing the torch to travel relative to the welding groove at a speed commensurate with weld bead deposition to the full depth of the welding groove, the torch maintaining a positive lead angle relative to the plate surface.

14. The method as set forth in claim 13 wherein the second weld groove has one beveled surface sidewall.

15. The method as set forth in claim 13 wherein the torch maintains a positive lead angle relative to the plate surface being welded of 5° to 15°.

16. The method as set forth in claim 13 wherein the torch lies substantially in the plane including the surface of the weld groove sidewall formed by removing plate material from the second plate.

17. The method as set forth in claim 13 wherein the welding torch maintains a torch angle relative to the weld line of 15° to 25°.

18. The method as set forth in claim 13 wherein the shielding gas is only argon.

19. A welded joint made by gas metal-arc welding for joining base metal plates comprising:
(a) a joining line lying in a substantially vertical plane formed between abutting edges of welded plates;
(b) a first narrow and deep weld bead extending along said joining line on one surface of the joined base metal plates deposited in a single welding pass to completely fill a first weld groove prepared by removing base metal material from the edge of only one plate leaving a planar root portion equal to or less than one-half the plate thickness;
(c) a second narrow and deep weld bead on the opposite surface of the joined articles and deposited in a single welding pass to completely fill a second weld groove formed by removing base metal material substantially from the same plate as for said first weld groove along a line coextensive with said joining line of said first weld bead and to a depth at least extending to said first weld bead penetrating from the opposite surface of the joined articles;
(d) said first and second weld beads forming a generally K-shaped welded joint having a total weld bead thickness up to twice as great as the bead width; and
(e) said weld beads deposited in said grooves by a welding torch maintained at a positive lead angle relative to the plate surface.

20. The welded joint as set forth in claim 19 wherein the first and second weld beads were deposited in weld grooves formed between a beveled surface along the edge to be welded of only one metal plate and a planar edge of said abutting metal plate, said grooves having an angle of between 25° to 35° as measured from said beveled surface to a plane parallel to the plate edge and normal to the surface of the plate.

21. The weld joint as set forth in claim 19 wherein the first and second weld bead each has a bead thickness at least 50% of the bead width.

22. A welded joint made by gas metal-arc welding for joining substantially vertical thick plate of aluminum and its alloys comprising:
(a) a joining line lying substantially vertically formed between abutting edges of welded plates;
(b) a narrow and deep first weld bead extending along said joining line on one surface of the joined plates deposited in a single upward welding pass and penetrating from the plate surface to a depth equal to or more than one-half the plate thickness; and (c) a narrow and deep second weld bead on the opposite surface of the joined plates deposited in a single upward welding pass along a line coextensive with said joining line of said first weld bead, said second weld bead penetrating from the plate surface to a depth at least extending to said first weld bead penetrating from the opposite surface of the joined plates;

(d) said weld beads deposited in weld grooves formed by removal of plate material substantially from the edge of only one plate with the weld groove for said second weld bead prepared after deposition of the first weld bead, and the weld joint formed by the weld beads having a generally K-shaped cross section, said first and second weld beads each having a bead thickness at least 50% of the bead width, the total weld bead thickness being up to about twice as great as the bead width, and said weld beads deposited in said grooves by a welding torch maintained at a positive lead angle relative to the plate surface.

23. Metal plate articles joined by gas metal-arc welding comprising:

(a) a welded joint extending along a joining line formed by the abutting edges of welded articles;

(b) a first weld bead extending along said joining line on one surface of the joined articles and deposited by a single welding pass to completely fill a first weld groove prepared by removing base metal material from the edge of only one plate leaving a planar root portion equal to or less than one-half the plate thickness;

(c) a second weld bead on the article surface opposite said first weld bead and deposited by a single welding pass to completely fill a second weld groove formed by removing base material substantially from the same metal plate as for said first weld groove along a line coextensive with said joining line of said first weld bead and to a depth at least extending to said first weld bead penetration from the opposite surface of the joined articles;

(d) said first and second weld beads forming a generally K-shaped welded joint having a total weld bead thickness up to twice as great as the bead width; and (e) said weld beads deposited in said grooves by a welding torch maintained at a positive lead angle relative to the plate surface.

24. The metal plate as set forth in claim 23 wherein the first and second weld bead each has a bead thickness at least 50% of the bead width.

25. Plate articles of aluminum and its alloys joined by gas metal-arc welding comprising:

(a) a welded joint extending along a joining line formed by the abutting edges of welded thick plate articles;

(b) a narrow and deep first weld bead extending along said joining line on one surface of the joined articles and deposited by a single welding pass to a penetration depth from the plate surface equal to or more than one-half the plate thickness; and (c) a narrow and deep second weld bead on the article surface opposite said first weld bead and deposited by a single welding pass along a line coextensive with said joining line of said first weld bead and penetrating from the plate surface to a depth at least extending to said first weld bead penetration from the opposite surface of the joined articles;

(d) said welded joint having a generally K-shaped cross section wherein weld grooves are prepared by removal of plate material substantially from the edge of only one plate with the weld groove for said second weld bead prepared after deposition of said first weld bead; and (e) said first and second weld beads each having a bead thickness at least 50% of the bead width, the total weld bead thickness being up to about twice as great as the bead width, said weld beads deposited in said grooves by a welding torch maintained at a positive lead angle relative to the plate surface.

* * * * *

UNITED STATES PATENT AND TRADEMARK OFFICE
CERTIFICATE OF CORRECTION

PATENT NO. : 4,292,496
DATED : September 29, 1981
INVENTOR(S) : Malcolm G. Hoy et al It is certified that error appears in the above–identified patent and that said Letters Patent are hereby corrected as shown below:

| | |
|---|---|
| Col. 1, line 35 | Change "have" to --has-- |
| Col. 2, line 48 | Change "aree" to --are-- |
| Col. 3, line 66 | Change "plate" to --plates-- |
| Col. 6, line 26 | Change "plate" to --plane-- |
| Col. 6, line 61 | Change "as" to --a-- |
| Col. 7, line 63 | Change "level" to --travel-- |

Signed and Sealed this

Eighth Day of December 1981

[SEAL]

Attest:

Attesting Officer

GERALD J. MOSSINGHOFF

Commissioner of Patents and Trademarks